Jan. 3, 1928.

E. H. BIRD 1,654,782

TREATMENT OF FUEL GAS

Filed Jan. 2, 1923   3 Sheets-Sheet 1

Inventor
Eugene H Bird
By ... Attys

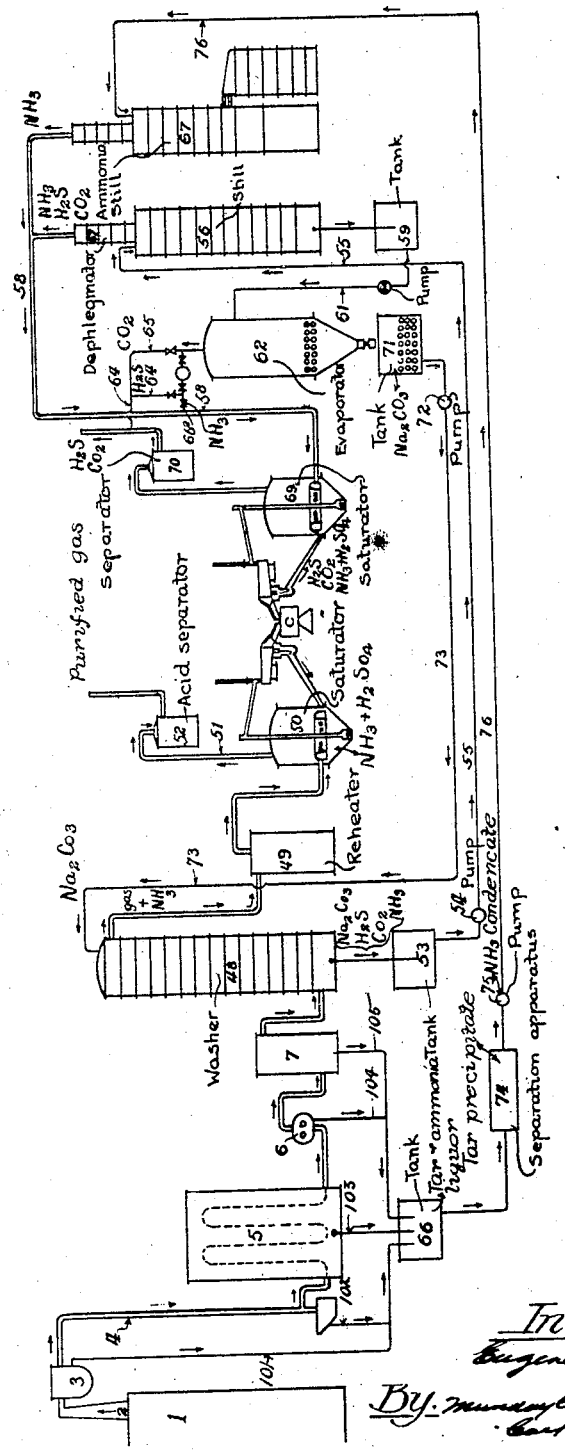

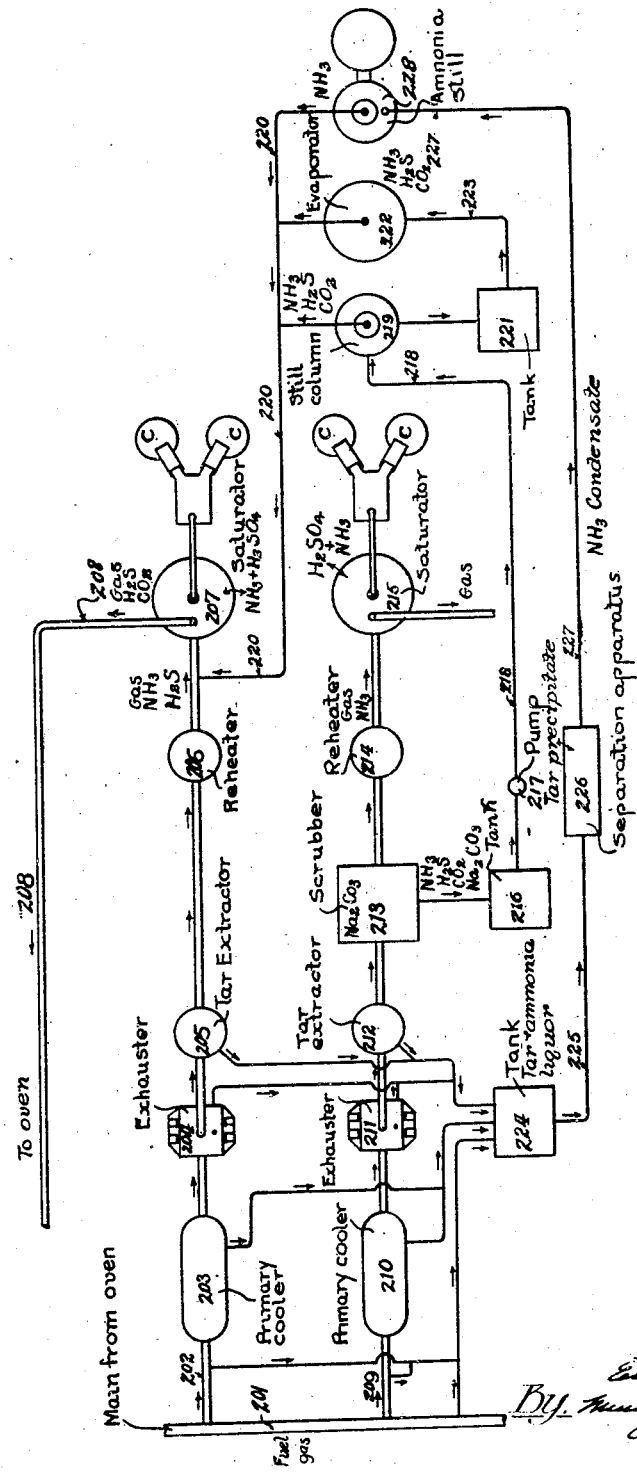

Patented Jan. 3, 1928.

1,654,782

UNITED STATES PATENT OFFICE.

EUGENE H. BIRD, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

TREATMENT OF FUEL GAS.

Application filed January 2, 1923. Serial No. 610,110.

This invention relates to the treatment of fuel gas containing impurities, such as hydrogen sulphide, carbon dioxide and hydrocyanic acid. An object of the invention is to effect, in a combined process, the recovery from such gas of the ammonia in commercially usable form and quantities, and also to remove the hydrogen sulphide and other impurities.

With regard to the purification of the gas of its hydrogen sulphide, carbon dioxide or hydrocyanic acid, there is employed a liquid purification process having features described and claimed in the co-pending application for Letters Patent of the United States of Frederick W. Sperr, Jr. and Ralph E. Hall, for gas purification process, filed December 8, 1921, Serial No. 520,805. Such a gas purification process involves: The removal of the hydrogen sulphide from the gas and its recovery in concentrated form suitable for commercial purposes, with little dilution of the hydrogen sulphide by carbon dioxide; an especial adaptability for employment with gases containing carbon dioxide, inasmuch as the carbon dioxide promotes the removal of the sulphur and the rejuvenation of the solution in the regeneration stage; an efficient operation in both absorption and regeneration stages notwithstanding variation in the amount of carbon dioxide present in the gas; a control of the regeneration whereby the absorbed gases are expelled from the solution irrespective of their amounts and relative proportions.

The present invention provides the combination of gas purification process, such, for example, as that stated above, with an efficient removal and recovery of the ammonia from the gas; and the invention contemplates the application of such a combined ammonia recovery and gas purification process to both an ammonia recovery process of the "indirect process" type and of the "direct process" type, as will be hereinafter more fully explained.

In addition to the general objects recited above, the invention has for further objects such other improvements or advantages in operation or results, as may be found to obtain in apparatus and processes hereinafter described or claimed.

In the accompanying drawings forming a part of this specification and showing for purposes of exemplification preferred forms in which the invention may be embodied and practiced, but without limiting the claimed invention to any such illustrative instances:

Fig. 2 illustrates apparatus for carrying out the invention with an ammonia recovery of the "direct process" type; and Fig. 3 illustrates a further embodiment of apparatus for carrying out the invention with an ammonia recovery of the "direct process" type.

Figure 1:
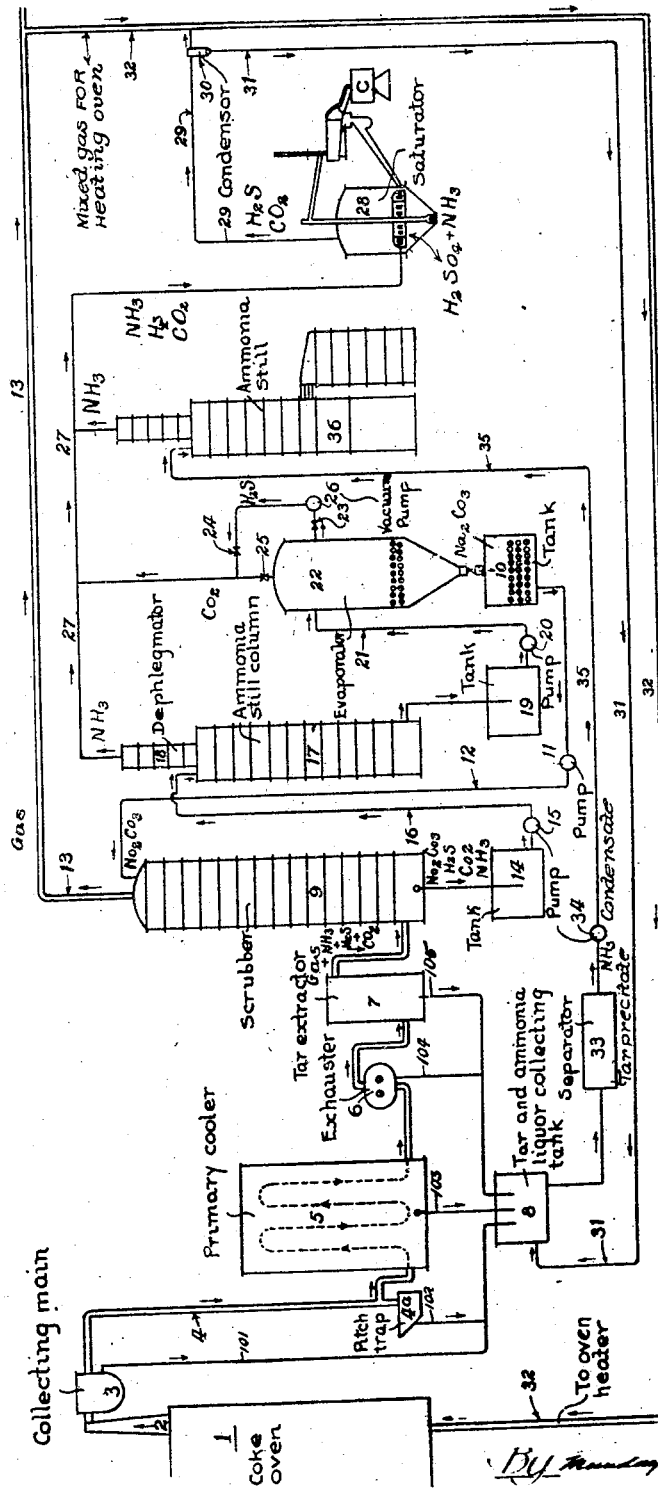
Figure 1 illustrates apparatus for carrying out the combined process of the invention in connection with an ammonia recovery of the "indirect process" type.

As herein described, the invention is applied to the recovery of ammonia, and to the removal of hydrogen sulphide, carbon dioxide and other impurities from fuel gas, such as coke oven gas. For convenience, the present description will be confirmed to this use of the invention. However, features of the invention are capable of other valuable applications, for example, the invention may be applied generally to the recovery of ammonia and removal of hydrogen sulphide from ammonia-charged gas, and particularly to those gases which also contain carbon dioxide. Consequently, the invention is not limited in scope to the herein described illustrative examples.

In the following description, particular reference will be made to the use of a sodium carbonate solution as the purifying agent, but with the understanding that other alkaline solutions may be advantageously employed. When gas, containing hydrogen sulphide, carbon dioxide and hydrocyanic acid is brought into contact with a solution of sodium carbonate, the following reactions occur:

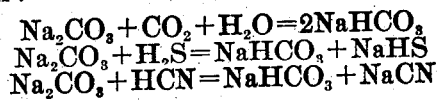

$Na_2CO_3 + CO_2 + H_2O = 2NaHCO_3$
$Na_2CO_3 + H_2S = NaHCO_3 + NaHS$
$Na_2CO_3 + HCN = NaHCO_3 + NaCN$

The gas to be purified is treated with the sodium carbonate solution for absorption of sodium sulphite, carbon dioxide and hydrogen sulphide, if any of the latter be present, and the resulting fouled solution is heated, first, under vacuum or reduced pressure for the removal of the bulk of the hydrogen sulphide together with some of the carbon dioxide, and, next, under a relatively greater pressure, preferably higher than atmospheric pressure, for the removal of the rest of the carbon dioxide. It has been demonstrated by tests that carbon dioxide is much more rapidly released from the solution and with a minimum evaporation of water when the solution is maintained at the higher temperatures available at the higher pressures. There are thus employed the best condition for the decomposition of the sodium hydrosulphide resulting from the absorption, i. e., heating of the fouled solution under vacuum, and also, the best condition for the decomposition of the sodium bicarbonate, i. e., heating of said solution under a pressure higher than atmospheric and at an increased temperature. The decomposition of the sodium hydrosulphide is accelerated in the presence of sodium bicarbonate, for the reason that:

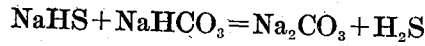
$$NaHS + NaHCO_3 = Na_2CO_3 + H_2S$$

Therefore, it is desirable to keep a maximum amount of bicarbonate in the solution while the sodium hydrosulphide is being decomposed. This necessitates first effecting the decomposition of the sodium hydrosulphide. After the bulk of the sodium hydrosulphide has been decomposed, by the heating under vacuum, and hydrogen sulphide has been expelled from the solution, the solution is heated under pressure at an increased temperature until the bicarbonate is decomposed to the required extent.

By conducting the first heating of the solution under vacuum, a high degree of efficiency in expulsion of the hydrogen sulphide is attained. Should the proportion of carbon dioxide in the gas be such that the amount of carbon dioxide absorbed be but little more than that actually required to react with the sodium hydrosulphide, according to the equation above, the initial heating under vacuum will be found sufficient to expel the carbon dioxide and thus properly to regenerate the solution. If, however, there be a considerable excess of carbon dioxide in the gas, the absorbed carbon dioxide will not be expelled so rapidly as the hydrogen sulphide, so that the complete expulsion of the carbon dioxide, remaining after the hydrogen sulphide is driven off, is not readily accomplished by continuing the heating under vacuum. However, if the solution be subjected to a further heating operation under pressure at increased temperature, the remainder of the carbon dioxide is very rapidly driven off.

Referring to Fig. 1 of the drawings, which shows arrangement of apparatus used in the combination of the invention with what is known as the "indirect process" for recovery of ammonia from ammonia-charged gas and the manufacture of ammonium sulphate. The distillate from the coal in the coke ovens 1 pass through standpipe 2 into collecting main 3 and is drawn off through pipe 4 into the primary cooler 5 and thence through the exhauster 6. From the exhauster, the gases pass into the tar extractor 7. Pipe 4 usually has a pitch trap 4ª into which any condensed tar and liquor collect. The tar and ammonia liquor from the collecting main, pitch trap, primary cooler, exhauster and tar extractor are collected in tank 8, as shown by the respective flow lines 101, 102, 103, 104 and 105 and provision is usually made for the circulation of part of this material over the collecting and offtake mains in order to ensure proper cooling.

The cooled gas, free from tar, is conducted from the tar extractor into the bottom of a scrubber 9 in which it is brought into contact with a solution of sodium carbonate pumped from the tank 10 by pump 11 through line 12. This solution absorbs some of the carbon dioxide together with most of the hydrogen sulphide and ammonia in the gas. By having a scrubber of sufficient size and employing the proper rate of circulation, all of the ammonia may be absorbed in said scrubber 9, but it is often preferable to conduct the treatment with sodium carbonate solution in a relatively small scrubber and to complete the absorption of ammonia with plain water in a second scrubber. The gas leaves the scrubber through the line 13.

The sodium carbonate solution employed in this process may be of a strength to test about 15 per cent total alkalinity calculated as $Na_2CO_3$ as it enters the scrubber. Greater or less strengths may be employed; but it is desirable to have less bicarbonate present than in the case of applying the purifying process to gas containing no ammonia. In practice, a solution containing between 3.5 percentum and 4.5 percentum sodium bicarbonate will generally be found satisfactory.

In the subsequent treatment of the solution for the removal of the absorbed ammonia, hydrogen sulphide and carbon dioxide, heating may be employed in a different sequence from that used when no ammonia is present. The ammonia is expelled together with approximately one-half of the hydrogen sulphide by heating the solution at atmospheric pressure. Some of the carbon dioxide also comes off in this treatment. The solution is then heated under vacuum for the expulsion of the remainder of the hydrogen sulphide. It is generally found that this treatment suffices for the removal of the carbon dioxide and heating under pressure at increased temperature is seldom necessary unless this is in unusual excess. However, provision is made so that this heating can be performed whenever necessary. With ammonia present in the gas being treated, there are a number of reactions in addition to those hereinbefore mentioned.

The ammonia is absorbed principally in the form of ammonium carbonates [e. g. (NH₄)2CO₃] and ammonium hydrosulphide (NH₄HS). Upon heating these decompose as follows:

$$(NH_4)2CO_3 = 2NH_3 + CO_2 + H_2O$$
$$NH_4HS = NH_3 + H_2S$$

The fact that the carbon dioxide and hydrogen sulphide in the gas partly combine with the ammonia renders the formation of sodium bicarbonate and sodium hydrosulphide less than when no ammonia is present. Inasmuch as the ammonia compounds are very readily decomposible, the expulsion of these gases takes place very readily. The decomposition of the sodium hydrosulphide is assisted by the carbon dioxide liberated in the first reaction just given as shown by the following equation:

$$2NaHS + CO_2 + H_2O = Na_2CO_3 + 2H_2S$$

The expulsion of the ammonia is preferably conducted in an ordinary ammonia still column. The liquor discharged into the tank 14 from the scrubber 9 is pumped by pump 15 through line 16 into the top of this column. Direct steam is blown into the bottom. The steam, ammonia and other gases pass through the dephlegmator 18, the operation of which is conducted so that the emerging gases have a sufficiently high concentration of ammonia. The subsequent treatment of these gases will be described later.

The solution runs from the bottom of the still column into tank 19. The apparatus for regenerating the solution is arranged for intermittent operation as in the prior application Serial No. 520,805. A single evaporator 22 may be employed to effect the entire regeneration of the solution. Sufficient solution is transferred to this evaporator by pump 20 through line 21. Valve 25 is closed and valves 23 and 24 are open. The vacuum pump 26 is started and heat applied to the evaporator until tests of the solution show that sufficient hydrogen sulphide has been expelled. It is preferable that the hydrogen sulphide remaining in the solution should not be over 10 percent of that present in the solution in tank 14.

If the tests of the solution show too much bicarbonate still remaining in the solution after the vacuum heating, the vacuum pump is shut off, valve 25 opened and valves 23 and 24 closed. Heating is continued under a pressure of 15 pounds, for example, until the bicarbonate is decomposed to the required extent. The regenerated solution is transferred to tank 10 which contains cooling coils. Sufficient water should be added to restore the original concentration of the solution with respect to total alkalinity. The cooled solution is then ready for circulation over the scrubber to effect further absorption from the gases. The evaporator, having been emptied, is ready to receive another charge of solution from the tank 19.

The gases from the evaporator join those from the ammonia still column 17 in line 27. If the former contain too much moisture, they may be passed through a dephlegmator before entering this line. The gases pass through line 27 into saturator 28 which is of any well known type adapted to the treatment of ammonia vapor with sulphuric acid. Ammonium sulphate is produced in the usual manner. The carbon dioxide and hydrogen sulphide pass through the sulphuric acid unchanged and emerge through pipe 29 which may have a small condenser 30 to remove any excess of moisture. The condensate from this may be returned through line 31 to tank 8 or to some other part of the ammonia condensate system which will be described presently. The hydrogen sulphide and carbon dioxide from line 29 may be disposed of by passing them into line 32 which conveys that portion of the gas which is used to heat the coke ovens; or they may be disposed of or utilized in any other manner desired.

It now remains to describe the treatment of the condensate collected in tank 8. This consists of tar and ammonia liquor and is passed through any well known form of separator (indicated at 33) in which the tar is separated from the ammonia liquor. The ammonia liquor is transferred by pump 34 through line 35 to the ammonia still 36 which has the usual appurtenances, viz: lime chamber, fixed still column, dephelgmator, etc. which need not be described in detail. The ammonia, liberated in this still, joins the gases in line 27 and passes with the rest of the ammonia into the saturator 28.

The process is also adapted to combination with the usual processes for making concentrated ammonia liquor in by-product coke oven operation. In this case, more elaborate dephlegmators are used and condensers are employed to prepare the liquor. Any excess of hydrogen sulphide and carbon dioxide over the allowable requirements in the liquor may be removed by apparatus which is well known in the art.

One form of apparatus employed in combining the process with the Koppers "direct process" for ammonium sulphate manufacture is shown in Fig. 2. According to the Koppers direct process, the gas from the coke ovens 1 passes through standpipe 2 into collecting main 3 and thence through pipe 4 into primary cooler 5. The exhauster 6 pumps the cooled gas through tar extractor 7, and in the ordinary operation of the process, the tar freed gas is conducted into a reheater and thence into a saturator. In the present instance the washer 48 is interposed between the tar extractor 7 and the reheater 49. The solution circulated over this washer is preferably a concentrated solution of sodium carbonate which is limited in amount so as to absorb most of the hydrogen sulphide without, however, absorbing all of the ammonia. In fact, it is desirable to conduct the operation in such a way as to absorb a minimum amount of ammonia, which may be effected by employing a limited amount of solution in a washer of high efficiency. The gas from the washer 48 passes through reheater 49 and thence into saturator 50, finally emerging in a purified condition through the pipe 51 which has an acid separator 52 to catch any spray mechanically carried out of the saturator. The solution runs out of the washer into tank 53 and is pumped by pump 54 through line 55 into still column 56 which is heated by direct steam. Here, all of the ammonia absorbed, together with some of the hydrogen sulphide and carbon dioxide, is driven out and passes through dephlegmator 57 into line 58. The solution from the still column runs into tank 59. Sufficient of it to fill the evaporator 62 is transferred by pump 60 through line 61. The operation of the evaporator for the final regeneration of the solution is conducted as has been previously described. The valve-controlled flow line 66ª is provided so that if the solution in the evaporator still contains some ammonia the gases may be passed into line 58 until this ammonia is expelled. Otherwise, the gasses from the vacuum pump may be passed through line 64 to join the gases leaving saturator 69. After the heating under vacuum is carried to a sufficient extent to expel the hydrogen sulphide, any carbon dioxide remaining over the required amount is expelled by heating under pressure. The gases in this final heating pass through by-pass line 65 into the line 64. The regenerated solution after proper dilution and cooling in tank 71 is transferred by pump 72 through line 73 to the washer 48.

The condensates from the collecting main and subsequent apparatus to and including the tar extractor are accumulated in tank 66. The condensates consist of tar and ammonia liquor and are transferred to tar separation apparatus 74. The ammonia liquor from this is pumped by pump 75 through line 76 to the ammonia still 67 which has the usual appurtenances. The vapors and gases from this still join those from still 56 in line 58 and are passed into saturator 69. The carbon dioxide and hydrogen sulphide pass through the sulphuric acid unchanged and go through separator 70 after which they may be joined by any gases brought from evaporator 62 through pipe 64. These gases being rich in hydrogen sulphide may be used for the manufacture of sulphuric acid which is needed in the operation of the saturators for the production of ammonium sulphate. Thus, the invention furnishes means for making all the necessary materials save air for ammonium sulphate manufacture from the original constituents of the gas, provided the gas is sufficiently high in hydrogen sulphide.

Instead of utilizing the gases from the saturator and evaporator for making sulphuric acid or otherwise, they may be disposed of by putting them into that portion of the coke oven gas which is used for heating the ovens. This method of disposition makes possible a different arrangement of apparatus which is shown in plan in Fig. 3.

It is unnecessary to remove the hydrogen sulphide from that part of the gas which is used for heating the coke ovens. In most plants such gas passes through a series of apparatus, comprising primary coolers, exhausters, tar extractors, reheaters, saturators, etc., which is separate from the apparatus used for treating the surplus gas. As shown in Fig. 3, the raw gas is brought from the coke ovens in main 201 and that part which is to be used for heating the ovens passes through pipe 202 into primary cooler 203 and thence is pumped by exhauster 204 through tar extractor 205, reheater 206, and saturator 207, finally returning to the ovens through main 208. The surplus gas passes through main 209, primary cooler 210, exhauster 211, and tar extractor 212. In the application of our invention, scrubber 213 is interposed in the usual system directly after the tar extractor. The surplus gas passes through this washer in which it is brought into contact with a strong solution of sodium carbonate which removes a large part or all of the hydrogen sulphide together with some ammonia. The gas then passes into reheater 214 and saturator 215, the latter converting the remaining ammonia into ammonium sulphate by means of sulphuric acid. The surplus gas leaving the saturator is then in condition to be disposed of for any purpose desired.

The treatment of the sodium carbonate solution from the scrubber 213 is readily understood from previous descriptions. This solution runs into tank 216 and is pumped by pump 217 through line 218 into still column 219 which is heated by direct steam. Here all of the ammonia absorbed, together with some of the hydrogen sulphide and carbon dioxide, is driven out and passes (through a dephlegmator if necessary) into line 220. The solution from the still column runs into tank 221; sufficient of it to fill evaporator 222 is transferred through line 223 and the operation of the evaporator for the final regeneration of the solution is conducted as has been previously described. The gases from the evaporator pass into line 220.

The condensates from the collecting main and subsequent apparatus in the entire system, to and including the tar extractors, are accumulated in tank 224. The condensates are transferred through line 225 to tar separation apparatus 226. From this, the ammonia liquor is transferred through line 227 to the ammonia still 228. The vapors and gases from this still go into line 220.

Thus, it will be seen that all of the ammonia, hydrogen sulphide and other gases removed from the surplus gas in the washer 213 are put together with the usual distillation gases from the treatment of the ammonia liquid into a common pipe 220. This pipe conducts them into the gas leaving the reheater 206 and entering the saturator 207. Their entire ammonia content is absorbed and recovered in this saturator, while the remaining gases go to the coke ovens to be consumed.

There is thus developed a system of purifying surplus gas from the coke ovens and disposing of the impurities by putting them into that portion of the gas which is to be used for heating the ovens and which is treated in a separate saturator for the recovery of its ammonia content.

The ammonium sulphate formed in any of the saturators shown may be dried in the usual centrifuge C.

The invention as hereinabove set forth may be variously embodied within the scope of the claims hereinafter made.

What is claimed is:

1. The process of treating fuel gas, which consists in: subjecting the gas to a primary cooling stage and then removing from the gas the residue of the tar, while collecting the ammonia liquor condensate from both the primary cooling and tar extraction stages; then washing the tar-freed gas with a sodium carbonate solution to absorb hydrogen sulphide, carbon dioxide and ammonia from said gas; then subjecting the solution from the absorption stage to a distilling operation to remove the bulk of the ammonia; then heating it under vacuum to expel the bulk of hydrogen sulphide, and further heating under pressure to convert sodium bicarbonate to sodium carbonate; recirculating the thus regenerated solution to the absorption stage; subjecting the ammonia liquor condensate to a distilling operation; and collecting the ammonia vapors from the solution absorption stage distillation, the solution regeneration stage and the condensate distillation, and passing such collected vapors to and through a saturation bath to recover the ammonia; substantially as specified.

2. The process of treating fuel gas, which consists in: subjecting the gas to a primary cooling stage and then removing from the gas the residue of the tar, while collecting the ammonia liquor condensate from both the primary cooling and tar extraction stages; then washing the tar-freed gas with a sodium carbonate solution of such concentration and of such small volume as to absorb the bulk of hydrogen sulphide and carbon dioxide from the gas, but only to absorb part of the ammonia; then passing the washed gas to and through a saturation bath to recover the bulk of the ammonia; then subjecting the solution from the absorption stage to a distilling operation to remove the absorbed ammonia; then heating it under vacuum to expel the bulk of hydrogen sulphide, and further heating under pressure to convert sodium bicarbonate to sodium carbonate; recirculating the thus regenerated solution to the absorption stage; subjecting the ammonia liquor condensate to a distilling operation; and collecting the ammonia vapors from the solution absorption stage distillation, the solution regeneration stage and the condensate distillation, and passing such collected vapors to and through a saturation bath to recover the ammonia; substantially as specified.

3. The process of treating fuel gas, which consists in: subjecting the gas to a primary cooling stage and then removing from the gas the residue of the tar, while collecting the ammonia liquor condensate from both the primary cooling and tar extraction stages; then washing the tar-freed gas with an alkali-metal carbonate solution to absorb hydrogen sulphide, carbon dioxide and ammonia from said gas; then subjecting the solution from the absorption stage to a distilling operation to remove the bulk of the ammonia; then heating it under vacuum to expel the bulk of hydrogen sulphide, and further heating under pressure to convert alkali-metal bicarbonate to alkali-metal carbonate; recirculating the thus regenerated solution to the absorption stage; subjecting the ammonia liquor condensate to a distilling operation; and collecting the ammonia vapors from the solution absorption stage distillation, the solution regeneration stage and the condensate distillation, and passing such collected vapors to and through a saturation bath to recover the ammonia; substantially as specified.

4. The process of treating fuel gas, which consists in: subjecting the gas to a primary cooling stage and then removing from the gas the residue of the tar, while collecting the ammonia liquor condensate from both the primary cooling and tar extraction stages; then washing the tar-freed gas with an alkali metal carbonate solution of such concentration and of such small volume as to absorb the bulk of hydrogen sulphide and carbon dioxide from the gas, but only to absorb part of the ammonia; then passing the washed gas to and through a saturation bath to recover the bulk of the ammonia; then subjecting the solution from the absorption stage to a distilling operation to remove the absorbed ammonia; then heating it under vacuum to expel the bulk of hydrogen sulphide, and further heating under pressure to convert alkali-metal bicarbonate to alkali-metal carbonate; recirculating the thus regenerated solution to the absorption stage; subjecting the ammonia liquor condensate to a distilling operation; and collecting the ammonia vapors from the solution absorption stage distillation, the solution regeneration stage and the condensate distillation, and passing such collected vapors to and through a saturation bath to recover the ammonia; substantially as specified.

5. The process of treating fuel gas, which consists in: washing such gas with a sodium carbonate solution to absorb hydrogen sulphide, carbon dioxide and ammonia from said gas; then subjecting the solution from the absorption stage to a distilling operation to remove the bulk of the absorbed ammonia; then heating it under regulable pressure, and recirculating the thus regenerated solution to the absorption stage; substantially as specified.

6. The process of treating fuel gas, which consists in: washing such gas with an alkali-metal carbonate solution to absorb hydrogen sulphide, carbon dioxide and ammonia from said gas; then subjecting the solution from the absorption stage to a distilling operation to remove the bulk of the absorbed ammonia: then heating it under regulable pressure, and recirculating the thus regenerated solution to the absorption stage; substantially as specified.

7. The process of treating fuel gas, which consists in: washing such gas with a sodium carbonate solution of such concentration and of such small volume as to absorb the bulk of hydrogen sulphide and carbon dioxide from the gas, but only to absorb part of the ammonia; then passing the washed gas to and through a saturation bath to recover the bulk of the ammonia; substantially as specified.

8. The process of treating fuel gas, which consists in: washing such gas with a sodium carbonate solution of such concentration and of such small volume as to absorb the bulk of hydrogen sulphide and carbon dioxide from the gas, but only to absorb part of the ammonia; then passing the washed gas to and through a saturation bath to recover the bulk of the ammonia; then subjecting the solution from the absorption stage to a distilling operation to remove the absorbed ammonia; then heating it under regulable pressure, and recirculating the thus regenerated solution back to the absorption stage; substantially as specified.

9. The process of treating fuel gas, which consists in: passing such gas into contact with a solution of alkali-metal carbonate-bicarbonate mixture to absorb hydrogen sulphide, carbon dioxide and ammonia from the gas; subjecting the solution from the absorption stage to a distilling operation to remove the absorbed ammonia; and then heating it under regulable pressure; substantially as specified.

10. The process of treating fuel gas, which consists in: passing such gas into contact with a solution of alkali-metal carbonate-bicarbonate mixture to absorb hydrogen sulphide, carbon dioxide and ammonia from the gas; subjecting the solution from the absorption stage to a distilling operation to remove the absorbed ammonia; subjecting the solution containing the absorbed impurities to heating to expel such impurities and to restore the solution, to its original condition for further gas treatment; and regulating the pressure on the solution during the heating thereof to expel initially the bulk of hydrogen sulphide from the solution and thereafter the bulk of the absorbed carbon dioxide; substantially as specified.

11. A process for the treatment of fuel gas containing hydrogen sulphide, carbon dioxide and other impurities consisting in washing the gas with a non-volatile solution capable of absorbing simultaneously hydrogen sulphide, carbon dioxide and ammonia from said gas and then subjecting the liquid from the absorption stage first to a distilling operation to remove ammonia, and then to heating under regulable pressure to remove the aforesaid impurities, the liquid being thereafter recirculated to the absorption stage.

In witness whereof I have hereunto set my hand.

EUGENE H. BIRD.